United States Patent
Boschetti

(10) Patent No.: US 8,828,146 B2
(45) Date of Patent: Sep. 9, 2014

(54) METHOD AND EQUIPMENT FOR THE WASHING AGAINST CURRENT, FOR THE TRANSPORTATION AND THE PHYSICAL/CHEMICAL TREATMENT OF VEGETABLES AND FRUITS, IN A RESTRICTED ENVIRONMENT, WITH HIGH WATER AND ENERGY EFFICIENCY

(75) Inventor: Italo Boschetti, Paese (IT)

(73) Assignee: Turatti S.r.l., Venice (IT)

( * ) Notice: Subject to any disclaimer, the term of this patent is extended or adjusted under 35 U.S.C. 154(b) by 551 days.

(21) Appl. No.: 12/876,540

(22) Filed: Sep. 7, 2010

(65) Prior Publication Data

US 2011/0048466 A1    Mar. 3, 2011

Related U.S. Application Data

(63) Continuation of application No. PCT/IB2009/000446, filed on Mar. 5, 2009.

(51) Int. Cl.
| | |
|---|---|
| *B08B 3/06* | (2006.01) |
| *A23L 3/01* | (2006.01) |
| *A23N 12/02* | (2006.01) |
| *A23N 12/06* | (2006.01) |

(52) U.S. Cl.
CPC ............... *A23N 12/02* (2013.01); *A23N 12/06* (2013.01)
USPC .............. 134/21; 134/34; 134/42; 134/133; 134/134; 134/145; 134/147; 134/20

(58) Field of Classification Search
CPC .................................. B08B 3/06; A23L 3/001
USPC .......... 134/133, 134, 145, 147, 200; 426/431, 426/478, 479
See application file for complete search history.

(56) References Cited

U.S. PATENT DOCUMENTS

| 2,240,442 | A | * | 4/1941 | Paul ............................... 209/155 |
| 3,044,863 | A | | 7/1962 | Osborne et al. |
| 3,904,779 | A | | 9/1975 | Hinds |
| 5,413,131 | A | * | 5/1995 | Medlock ..................... 134/104.4 |
| 2006/0078661 | A1 | * | 4/2006 | Wang ............................ 426/521 |

FOREIGN PATENT DOCUMENTS

DE    3002610 A1    8/1980

(Continued)

OTHER PUBLICATIONS

International Search Report based on International Application No. PCT/IB2009/000446 with an International Filing date of May 3, 2009, 4 pages.

*Primary Examiner* — Saeed T Chaudhry

(74) *Attorney, Agent, or Firm* — Gesmer Updegrove LLP

(57) ABSTRACT

The technology of washing and treatment MWU (modular washing unit) is conceived to wash and treat fruits and vegetables in a confined environment, with progressively more and more clean water (counter-current) and with an optimal ratio between the quantities of water used and processed products. The system allows important savings of water, chemicals and energy. The technology of washing and treatment MWU (modular washing unit) is conceived to allow the transport and the treatment of the product in confined environment, with clean water (counter-current) In the MWU the product is submitted to sequence of filling and emptying with appropriated solutions, progressively cleaner, prior to subsequent discretionary treatments. A treatment plant can be equipped with a variable number of MWUs, with additional remote MWUs to meet the desired production capacity. Each MWU consists of a vertical watertight cylinder containing a concetric basket; on the top it is connected to the main product manifold and to the vacuum collector, and at the bottom it is connected to the product drain collector, to the load/unload manifold and to the fluids recycling manifolds. Each MWU is connected to the other MWU of the plant, and to the external tank, through independent manifolds, by appropriate valves, to prevent the mixing of fluids and the cross-contamination.

10 Claims, 3 Drawing Sheets

(56) References Cited

FOREIGN PATENT DOCUMENTS

| | | | |
|---|---|---|---|
| EP | 0065791 | A | 12/1982 |
| EP | 1654939 | A | 5/2006 |
| GB | 2021443 | A | 12/1979 |
| GB | 2351896 | | 1/2001 |
| WO | WO09109848 | A1 | 9/2009 |

* cited by examiner

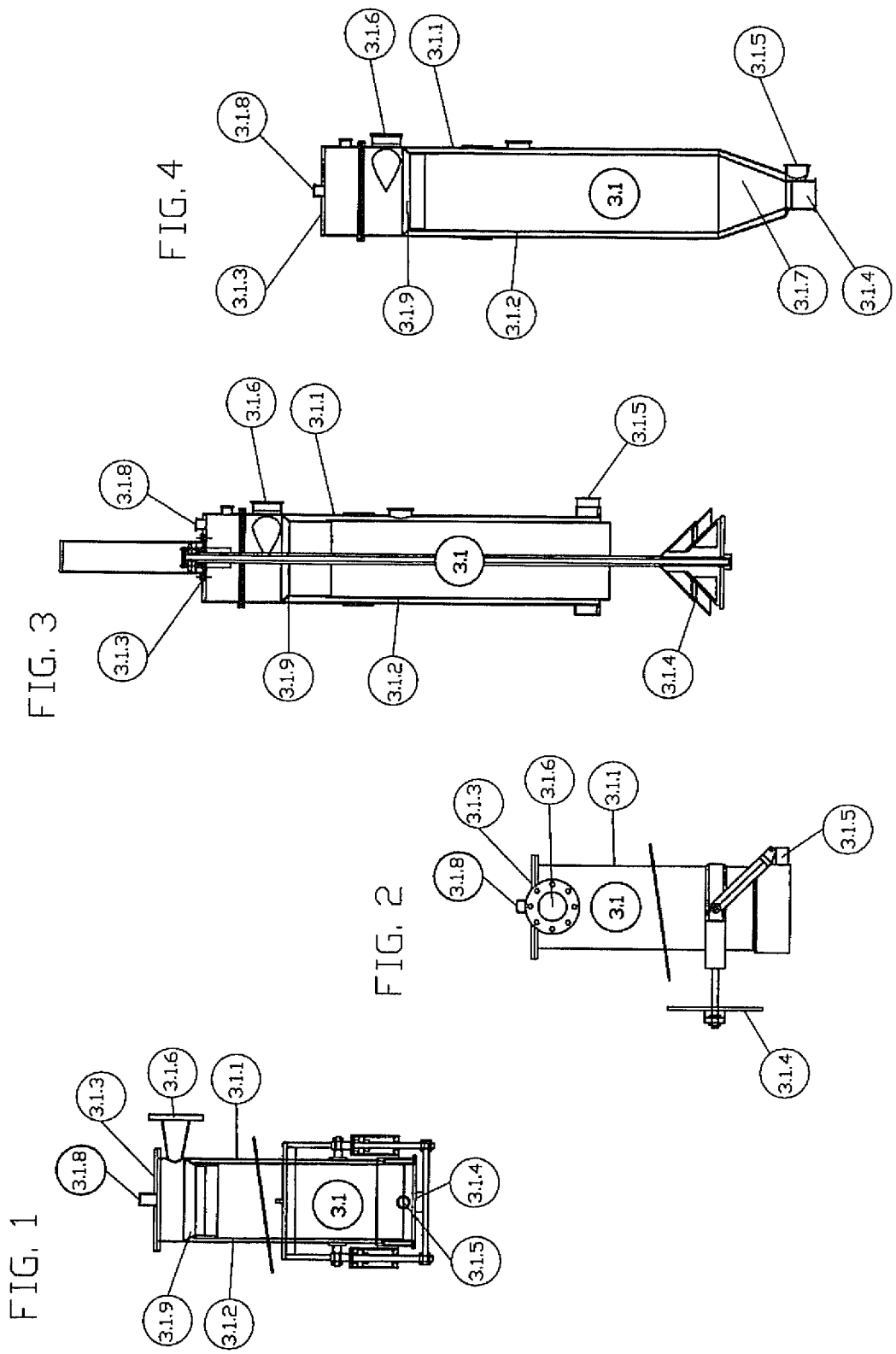

METHOD AND EQUIPMENT FOR THE WASHING AGAINST CURRENT, FOR THE TRANSPORTATION AND THE PHYSICAL/CHEMICAL TREATMENT OF VEGETABLES AND FRUITS, IN A RESTRICTED ENVIRONMENT, WITH HIGH WATER AND ENERGY EFFICIENCY

The present application is a continuation of PCT/IB2009/000446 filed on 5 Mar. 2009 which claims priority to Italian Patent Application No. TV2008A000038 filed on 6 Mar. 2008.

TECHNICAL FIELD

The invention refers to a process and machine for vegetable and fruit washing, but also for other industrial uses. The purpose is to make more efficient and safer, from the healthy point of view, the washing of vegetable and fruit products ready for consumption and/or addressed to other conservations and industrial transformation processes, maximizing the use of water efficiency during the working process, independently from the use of chemical additives, which tend therefore to make the cleaning of the washed fresh products more efficient and safer without the disinfection products. This innovative technology allows more than anything else, in respect of the law, the recycling of the processed solutions (micro-filtered water, chemical treatment solutions, hot water or icy water, etc) with sensible savings in water consumption, energy and chemical solutions, reducing, consequently, the environment impact, also in terms of polluting flows.

BACKGROUND ART

Traditional washing industrial processes foresees the dipping of the product in sequence in washing tanks: normally, in the first tank a dipping takes place in aired water to support the separation of the product and the rough tainted material; in the following tanks, the product is dipped in progressively cleaner water. The passage of the product from one tank to the other takes place by the overflow with the help of a mesh conveyor belt that supports dripping via gravity before introducing it in to the next tank. To limit the transportation of the tainted material to the next tank as much as possible, sometimes also with the help of clean water showers, appropriate carter and protections determine the re-flow of the dripped water from the product to the origin tank.

At the end of the washing cycle (maximum 3 dips) the quantity of the biological and chemical material present on the to product under treatment will be, obviously, proportioned to the polluted content in the washing water of the last tank and it will also depend on the quantity of liquid that the product will carry within itself. The factor that determines the cleaning grade of the product submitted to treatment is therefore given by the level of water purity held in the last tank of the washing process.

In spite of the attention given by the equipment builders to limit the pouring of contaminated water from one tank to the next, the progressive pollution of the washing water appears inevitable and exponential due to the high concentration of contaminated elements constantly brought by the same product submitted to wash. Regarding the microbiological contamination the situation is even worsened with the passing of time by the bacterial multiplication in the dirty water where bacteria find a fertile sub-layer. According to the French law, that represents the best technical practice, the cooling of the washing water along the entire draw plain is necessary, a fact that involves high energetic costs. The injection of fresh water in the washing circuit naturally reduces the presence of pollution in the tanks, but only a total replacement cycle can allow restoring of initial cleaning conditions. Given the substantial water volumes held in the washing tanks, linked to the high water capacity necessary to forward the product along the manufacturing line, an accurate product cleaning implies a high consumption of fresh water. From this derives the low complex efficiency of these washing traditional system, that were conceived when water supply, waste water disposal and energy were much cheaper.

In regards to this, the situation is evolving, as, form one side, the plant management is increasingly under pressure concerning the restrictive laws that are increasing the quality and quantity controls, and on the other side consumers are becoming, every day, more demanding and careful in terms of healthiness guarantees of the final product and also more sensible to environment issues. Consequently there is an increase of production costs, not only the one coming from the water and the draining of the flows, but also the ones related to the often cleaning operations of the machineries and of the working environment. To contain water consumption in the traditional systems and of the consequent flows, it is often necessary to limit water renewal, that become inevitably a further worsening of the operative conditions with the consequence of higher use of chemical disinfection (mainly the active chlorine). The French regulation, which represents the benchmark for this application, also foresees that the working environment air temperature is kept very low with the aim of containing the development of polluting microorganisms. This generates extremely uncomfortable conditions for the operators besides the further costs that this represents.

The technology proposed, based on the Modular Washing Unit (MWU), aims to give a positive reply on the above described problems; it aims, first of all, towards washing efficiency in terms of healthiness of the processed product, but it also aims to effectively reduce water consumptions and consequently the polluted flows, the use disinfecting chemical substances and energetic consumption, definitely limiting, with this, the overall environmental impact.

DISCLOSURE OF INVENTION

The achievement of a clean and safe product (with chemical and biological contents within the law limits) imposes that each washing cycle is finished with clean water and not with water constantly mixed up with the polluted one as regularly happens in traditional systems. It is essential that the washing water proceeds in counter current flow in respect of the product: the water progressively becomes more polluted while the dirty product progressively becomes cleaner. Both that you use in the washing process constantly renewed water or that you recycle the water, upon depuration treatment, the process cost reduction obliges, in first place, a decisive reduction of liquid flow maximizing the efficiency of the washing process. The new process and the new equipment (MWU technology) have been created to allow an efficient water use in product cleaning. Conceptually, this has the objective of:

minimizing, within the objective limits deriving from the physical characteristics of every single product, the volume of water used for each unit of processed product;

wash the product per batch to obtain a constant and defined relationship between quality of product and water used in the washing process.

work the product per batch to carry out a variable number of product rinse cycles, according to the necessity, without moving the products not to compromise its physical integrity.

work the product per closed batch to facilitate the isolation of the product removing any chemical or biological contamination deriving from the working environment.

work the product per batch to consent a sequence of washes (filling and emptying) with progressively cleaner water, drained from other washing units, until the final rinses with pure water, work the product per batch to consent to submit the products to different and independent treatments (chemical treatment, thermal and other treatments), also with the recovery and/or the total or partial recycling of the solutions used and the partial energetic recovery.

reduce the probability of damage deriving from dysfunctions of the process or operative accidents.

To ease the operation of cleaning the machines at the end of the process (Clean In Place cycles) making them reliable in technological terms, safe for the operators and completely automatic, with minimum consumption of disinfecting substances and minimum labour costs.

The working process is based on the Modular Washing Unit (MWU), available in different versions designed in the FIG. 1,3,4. The working process, considering the most probable hypothesis of loading the product in the MWU in water immersion, is subdivided in seven phases, repeated in pre-fixed sequence, in each MWU of a plant consisting of different MWU integrated between themselves:

a. phases of soaking and conveying (facultative);
b. phases of loading MWU and of product subsidence;
c. phases of washing of product;
d. phases of chemical treatment or other treatments;
e. phases of water removing and cooling of product;
f. phases of unloading and or product transfer.

Phase "a", soaking and conveying, has the principle function of favouring the softening, the detachment and precipitation, at least of the bigger fractions of the polluting deposits on the product. If product transportation towards the MWU of destination is done by the same washing water, this phase has also the function of conveying the product towards the load-collecting unit. The removal of dirt from the product can be helped also with the muttering of air in the liquid and can take place in tanks or other equipment, in which the product remains, immersed in water, for a certain period of time, and from which is sucked through the appropriate load manifold. For this phase any kind of tank used in traditional washing processes can be used, which does not have original characteristics and is not being considered for industrial patent. The same phase of soaking in particular cases can take place also directly inside the MWU when loading dry product, or with other suitable equipment.

Phase "b" consists of conveying the product, without compromising its physical characteristics, inside a basket (FIG. 1,2,3,4,5,6—no 3.1.2) integrated in the MWU. The product is loaded inside the basket of the MWU until the optimal weight-volume ratio for each type of processed product is reached. Inside the MWU, without any further movement and isolated from the external environment, the product can be submitted to wash and other phases of the process. It is foreseen that the energy for product transfer in water suspension, from the soaking tank to the basket of the MWU, is mainly achieved by the use of vacuum, created, on command, within the MWU of destination; vacuum determines the suction of the water-product mix from the soaking tank without any obstacle or mechanical interference. For the MWU loading, other alternative systems can be adopted, such as dry transport, or other mixed transportations.

Phase "c", the washing phase, consists of submitting the product to multiple rinses, each one consisting of the complete filling and successive emptying of the MWU with water coming from other MWUs. At each cycle cleaner water is used; the final rinse is made with pure water supplied from the hydraulic network or from the water treatment and recycling system. The number of rinses of the washing process depends on the contamination state of the initial product and also, obviously, from the legal limits of chemical and microbiological contamination of the final product. In the MWU the washing process, typical for every type of product, can be managed with the maximum flexibility. To minimize water consumption, guaranteeing in any case an excellent qualitative result of the product (cleanliness), the systems allows the possibility that the water discharged from a MWU can be used in another MWU containing more polluted product, in such a way that the water, progressively more dirty, flows in counter-current in respect of the product undergoing treatment, which gets in contact with cleaner water at each stage. It is evident that an optimal water consumption requires the use a set of MWUs, connected by appropriate manifolds and relative valves of interception in such a way that the whole sequence of rinsing foreseen for the wash can take place cyclically and independently in each MWU. The passing of washing water from one MWU to the other will be achieved by the effect of negative pressure, artificially created in the MWU of arrival, with respect to the atmospheric pressure maintained in the MWU of departure. As an option, the passage of water can also be done by appropriate pumps. The washing phase is concluded by one or more rinses with clean water in the MWU sucked towards or pumped to the MWU, by appropriate external tanks or network. As said, the number of water passing can be carried out at pleasure. In the plant described as an example in this document, the washing process, carried out in the plant as designed in FIG. 6, consists of a loading phase, three water transfer between MWUs, a wash with clean water and finally a product transfer using icy water.

Phase "d", product chemical treatment, consists of soaking the product in a specific solution, for example anti-oxidants or other. This is a facultative phase, which can take place at the end of the washing in every single MWU with the recovery and/or the re-use of the solution. Also in this phase the used energy for liquid transfer is supplied from the starting difference of absolute pressure between the environment and the MWU of arrival, but can also be done by appropriate pumps. This phase will probably be implemented in the practice, but is not considered in the present technical relation.

Phase "e", phase of water removal and cooling of product, consists of submitting optionally the product to a drying process creating cyclically a vacuum inside the MWU, at an absolute pressure lower than the vapour pressure of the washing water. The evaporation of the water other than drying the product, cools it quickly, stopping the development of bacteria, contributing in such a way a sensible increase of the product "shelf-life". This technology has been known for quite a long time, and the originality consists in the fact that this treatment can take place in the same MWU in which the product washing takes place. The partial water-removal from the product, can also be obtained by spinning effect in which case the internal tank of the MWU will be of a round, motored type.

The phase "f", unloading stage, consists of unloading the product from the MWU after the entire washing/treatment cycle completes; this can be achieved either by gravity on appropriate transport system placed beneath the MWU, as foreseen in the designed plant in FIG. 5, or conveying product-water mix, by suction through the appropriate manifold, to a remote MWU which provided with a water-removing system and/or a spinning system, and also with a full bore product unloading port, as foreseen in FIG. 6. The remote MWU is supplied with an air-tight manifold, which allows the product to be unloaded from the washing MWU, conveying it to considerable distance and height without exposing it to polluting elements.

As mentioned, the washing process above, can also be done also with a loading system of the MWU without water, in which case the product is loaded as it is (without water) directly in the MWU through the appropriate mechanical conveyor or with the use of recycled hydraulic flows with sucking of product by Venturi effect. In this case, phase "a", the soaking stage, is removed because it can be done inside the MWU by programming the cycle.

The plant is composed structurally of the following main parts each one having a specific function operating according to predetermined sequences.
1. soaking and conveying section (optional);
2. section of loading and conveying of the product in the MWU;
3. treatment section: Modular Washing Unit (MWU);
4. vacuum production section;
5. pressure compensation section;
6. water recycling and conveying and loading, unloading MWU;
7. hydraulic flow control section;
8. clean water supply section;
9. process solution storage, recovery and recycling section (cool water and chemical treatment solutions);
10. processed product transport and remote unloading section.

1 section of soaking and conveying (FIG. 5,6—No 1): in this section the phase "a" of the washing cycle takes place. It consists of a soaking tank where the product is regularly immersed through the loading hopper (FIG. 5,6—no 1.1) also with the use of a weighing system. The unidirectional water flow from one side to the other of the tank, created by the recycle pump, slowly pushes the product toward the point of aspiration of the point of the submerged transfer hopper. In its journey the product is continually remixed by turbulence created artificially in the liquid by air bubbles flowing from the base toward the top. Structurally this section is composed of the following part:

1.1 Product loading hopper (FIG. 5,6—no 1.1) loaded by the appropriate conveyor. Generally this is placed on one side of the rectangular tank and favours the regular immersion of the product in the tank without creating loss of product. This can consist of an element similar to that of the automatic weighing system.

1.2 Suction port (FIG. 5,6—no 1.2) of the conveying manifold which has the function to collect the product and water in which it is immersed, and to convey them in the transfer manifold (FIG. 5,6—no 2.1). Its form is suitable to the conveying both of floating products and of product denser than water.

1.3 The discharge valve (FIG. 5,6—no 1.3) removes periodically the mud that settles on the bottom of the tank.

1.4 Recycling port (FIG. 5,6—no 1.4) has the function to allow the recovery of the overflow water which is then recycled in the soaking tank or conveyed to the depuration system for recycle, if necessary.

1.5 Unloading of excessive water (FIG. 5,6—no 1.5): the water discharged from the first rinse of MWU (the most dirty water), cyclically pumped in the soaking tank, becomes excessive with respect to its capacity and is discharged through the overflow pipe (FIG. 5,6—no 1.6) which is placed closed to the suction point of the product (FIG. 5,6—no 1.5); the excessive water is collected in a auxiliary tank to be recycled in the soaking tank or to be sent to the depuration system for the next recycling process.

2. Section of convey/loading of the product (FIG. 5,6—No 2): in this section the phase "b" of the working cycle occurs. It has the function to convey the product contained in the soaking tank and the same water in which it is suspended towards the MWU. It is composed by the following elements:

2.1 Conveying product hopper (FIG. 5,6—no 2.1): has the function to collect the product-water mix from the soaking tank and to convey it into the transport manifold. It is situated on the opposite side of the soaking tank with respect to the inlet of recycled water. The size of the aspiration point, always submerged, is such that the speed of the fluid (on average above 0.1 m/s—variable in relation to the capability of the pump) also sucks the floating products with a lower specific weight. From the hopper point the water mixed with the product the is conveyed in the funnel below towards the manifold hole. Products with a specific weight higher than water that anyway sink, are collected on an submerged inclined platform that convey to the hopper, also this immersed, and from the hopper to the transport manifold.

2.2 Product transport manifold (FIG. 5,6—no 2.2): has the function to convey product-water mix towards the MWU. Its mechanical structure is as smooth as possible to minimize flow resistance, and the speed is calculated not to damage the product during transport. The smoothness and the absence of dead-points on its internal side also eases the automatic operation of disinfection (CIP) at the end of the working cycle.

2.3 MWU selection valve (FIG. 5,6—no 2.3.1): allows the product-water mix flow to the appropriate MWU. Said valve for each MWU must have such dimensions and characteristic not to create resistance to the passage of product-water mix. This valve (FIG. 5,6—no 2.3.1) and the corresponding unloading valve (FIG. 6—10.1), in the case that the unloading of the product in the remote MWU is foreseen, are the only internal valves interested in the passage of the product-water mix. Every MWU is disposed of this valve (FIG. 5,6—no from 2.3.1 to 2.3.4).

3. Specific Treatment Section (MWU) (FIG. 1,2,3,4,5,6— No 3.1 a 3.4): in this section the phases of the washing cycle "c, d, e, f" take place. It represents the most technologically representative and qualifying section of the equipment since it presides over the phases on which the efficacy and efficiency of the entire treatment process are based. It consists of modular MWU, within which all the phases of product processing take place (washing sequence, thermal treatment, chemical treatment or otherwise) without moving the product. The aforementioned MWU can be sized at need and can also have rotation basket (instead of fixed) to be able to drain the product before each unloading, increasing the efficiency of the washing process. The MWU is composed of the following parts:

3.1 The casing of the MWU (FIG. 1,3,4—no 3.1.1), consists of a rigid cylindrical casing of various length and sections, that can be provided in the lower part with a ring for the hydraulic seal of the closure door, if the direct unloading of product on the lower belt is foreseen, or with a conveying cone (FIG. 4—no 3.1.7) if product transfer in a remote unit is foreseen. The casing is also reinforced on its superior part close to the attachment of the head (FIG. 1.2.3.4—no 3.1.3). On this, on the inferior border edge, a sleeve is placed (FIG. 1,2,3,4—no 3.1.5) for the loading and unloading of fluids through the appropriate valve. Next to the superior border, on the edge of the head, a manifold attachment has been applied for product loading (FIG. 1,2,3,4—no 3.1.6). It is important to say that both the shape and the position of the attachment on the head (FIG. 1,2,3,4—no 31.6) can be easily changed if the loading of the dry product is foreseen. The planting of the MWU predisposed for the unloading of the product directly on the belt below is predisposed for the attachment of an unloading door at the bottom (FIG. 1,2,3—no 3.1.4). The ones predisposed for product transfer in the remote MWU (FIG. 4) have instead an conveying cone for the product towards the transfer manifold (FIG. 4—no 3.1.4).

3.2 MWU internal basket (FIG. 1,2,3,4—no 3.1.2): it has the fundamental function to contain the product subjected to washing treatment during all the phases of the process and must then consent the rapid draining of treatment fluid in all the parts of the process. It is composed by a basket having the same section of the casing (generally a cylinder shape), slightly smaller than the casing. On the upper part, completely open, the basket has a holding ring which holds it to the internal surface of the plating. In the inferior part, also completely open, the basket leans on the door when this is in the closed position, stopping the exit of the products towards the unload port. This can also have a telescopic draining terminal ring, which makes its leaning against the door to more precisely and at the same time prevents the deposit of the product on the holding ring during the unloading of the product. In the case the MWU has a conical base, being predisposed for the transfer of product in other remote units, the inferior part of the basket will also be conical. The rigid walls of the basket must be draining for all types of worked product. The pores (can be holes or mesh) on the draining walls of the basket can't be too wide to avoid the loss of fragments of products and mustn't be rough not to prevent the sliding of the product towards the base during unloading. It can also be constructed with a certain liberty on vertical movement, telescopic with respect to the plating, with the objective of facilitating the detachment of the product during unloading through the opening of the door.

3.3 Head of MWU (FIG. 1,2,3,4—no 3.1.3): it is composed a by rigid element which represents the superior closure of the MWU to which it is linked through a flange and with other possible airtight closure (clamp, etc). It allows the extraction of the basket from the MWU and it is provided with the connections to the vacuum manifold (FIG. 1,2,3,4—no 3.1.8) and to the compensating manifold (FIG. 1,2,3,4—no 3.1.8)

3.4 MWU closing door (FIG. 1,2,3—no 3.1.4): it represents the only mobile element of the MWU and has the function of unloading the product of the lower conveyor belt. It has an airtight closure and it opens on command the inferior opening, that interests the whole section of the aforementioned MWU, to facilitate the unloading of the product at the end of the treatment cycle. This is applied only if the unload of the product by gravity under the MWU is foreseen. This can be done in different ways with different automatic methods. In FIGS. 1 and 2—no 3.1.4 the position of total closure and opening of a type of door are demonstrated. In FIG. 3 an alternative construction is shown (FIG. 3—no 3.1.4). In the case that the working machinery foresees the transport of the product to another remote MWU, for the unloading of the loading hopper of the of weighing system, for example, the inferior terminal part of the MWU will be composed by a terminal cone and sleeve (FIG. 4—no 3.1.4) to convey the product to the manifold (FIG. 6—no 10.2).

4. Vacuum creation section (FIG. 5,6—No 4): In this section vacuum is produced as a preferential energy supply to start the recycling circuit (FIG. 5,6—no 6), both during the MWU loading phase with product-water mix, and for the pouring off of the washing liquid, between the different MWUs, and for the transfer of the product in the remote MWU if foreseen. It consists of the following parts 4.1 Vacuum tank (FIG. 5,6—no 4.1): has the function to create a difference of absolute pressure (negative relative pressure) between the MWU and the environment in such a way to handle the peaks of air flow from the various MWU during the different phases of the washing process. This allows the use of an emptying pump relatively small with respect of maximum capacity requested. Furthermore this allows the functioning of the pump in a regular way and also permits the separation of drops of liquid involved in the aspiration.

4.2 Vacuum manifold (FIG. 5,6—no 4.2): has the function to connect the vacuum tank with the different MWU through the respective valves (FIG. 5,6—no 4.3), with respect to the sequences of the phases of the washing cycle.

4.3 Vacuum selection valve (FIG. 5,6—no from 4.3.1 to 4.3.4): it has the function to connect the vacuum manifold with the MWUs, each one possessing its own dedicated valve.

4.4 Vacuum pump (FIG. 5,6—no 4.4): has the function to maintain a determined level of absolute pressure inside the vacuum tank. This is a liquid ring pump, sized according to the is dimensioning and consequently real consumption of every single washing plant.

5 Pressure compensation section (FIG. 5,6—No 5): has the function to balance the internal pressure of the MWU with atmospheric pressure during the unloading phase of fluids contained in it.

5.1 Compensation manifold (FIG. 5,6—no 5.1): connects all the MWU to the external environment through an absolute filtration system. Its internal surface must be as smooth as possible to prevent the formation of pollution which is difficult to disinfect during CIP. It has 2 valves of no return: one next to the absolute filter which consents the flow of air in aspiration only form the filter towards the MWUs and the other which permits only the release of eventual over pressures in the MWUs (from the manifold towards the external environment).

5.2 Vacuum interception valves (FIG. 5,6—no from 5.2.1 to 5.2.4): it connects each MWU with the manifold. Each MWU has its own dedicate valve.

5.3 Air filter (FIG. 5,6—no 5.3): it has the function purifying the air taken from different MWU to prevent the pollution of the product during the different phases of the unloading and the different passages of process liquid. Its size and typology depends on the characteristic of the polluters in the air of the working environment where the plant is located.

5.4 Over pressure release valve: it has the function, not always necessary, to release any over pressure that forms inside the MWU during the loading of fresh water deriving from the network or the water recycling system; it is a unidirectional valve (from the manifold towards the external environment).

6 Loading water recycling section (FIG. 5, 6—No 6): it has the function to recycle the water that is used to convey the product from the soaking tank to the MWU in use. The MWU draining basket is loaded with product-water mix by vacuum (or with a pump), then the water used for conveying the product is recycled in the soaking tank by a dedicated pump. Since every plant has several MWUs in parallel operating in sequence, the flow of recycled water in the soaking tank is almost continuous.

6.1 water recycling manifold (FIG. 5,6—no 6.1): it connects each MWU with soaking tank (FIG. 5,6—no 1.1) through the connection manifold (FIG. 5,6—no from 7.1.1 to 7.1.4), the respective valve (FIG. 5,6—no from 7.2.2.1 to 7.2.2.4) and the pouring manifold (FIG. 5,6—no from 7.3.2 to 7.3.4)

6.2 recycling pump (FIG. 5,6—no 6.2): drains the water from each MWU, through the recycling manifold (FIG. 5,6—no 7.3.1) and sends it to the soaking tank (FIG. 5,6—no 1.1). When no MWUs is being loaded, the pump continually recycles water in the soaking tank draining it through the appropriate deviation valve from the overflow pipe of the soaking tank.

6.3 water recycling valves (FIG. 5,6—no from 7.2.1.1. to 7.2.4.1) connect the connection manifold to the water recycle manifold.

6.4 water recycling manifold drain valve (FIG. 5,6—no 6.4): it allows the complete draining of the water recycling manifold before the periodic operation of washing and disinfection (CIF).

7 Flow direction selection section (FIG. 5,6—no 7): it has the function to control the sequence of water flows from one MWU to the others and also the liquid coming from the outside (renewing water, treatments solution). The direction of the flows is always determined by the different level of absolute pressure in the MWU; the system is designed in such a way that the water discharged from a MWU always flows to another MWU containing a more dirty product than the one where it is coming from. This arrangement allows to create a counter current flow of clean water with respect to the grade of cleanliness of the product contained in each MWU, improving the efficiency of the wash and reducing water consumption. During the washing process, the water passages concern only movements of liquid while the solid product always remains stable in the MWU.

7.1 Connection manifold (FIG. 5,6—no from 7.1.1 to 7.1.4): it has the function of connecting each MWU to the pouring manifolds (FIG. 5,6—no from 7.3.2 to 7.3.4) through the pouring valves (FIG. 5,6—no from 7.2.1.2 to 7.2.4.5). Each MWU has its own connection manifold (FIG. 5,6—no 7.1.1 for the 1st MWU 3.1; 7.1.2 for the 2nd MWU and so forth) each one provided with 5 selecting valves, three of which (FIG. 5,6—no from 7.2.1.2 to 7.2.4.4) connect the connection manifold to the pouring manifold, one (FIG. 5,6—no from 7.1.1.2 to 7.2.4.1) to the water recycle manifold and one to the treatment solution recycling manifold and/or to the remote MWU (FIG. 5,6—no from 7.2.1.5 to 7.2.4.5)

7.2 pouring flow selection valves (FIG. 5,6—no from 7.2.1.2. to 7.2.4.4 for the 1st MWU 3.1; from 7.2.1.2. to 7.2.5.2 for the 2nd MWU 3.2 and so forth); they allow the selection of the water flow direction from each MWU to the others through the pouring manifolds (FIG. 5.6—no from 7.3.2 to 7.3.4) at each stage of the washing cycle.

7.3 Pouring manifolds (FIG. 5.6—no from 7.3.2 to 7.3.4): they have the function of connecting each MWU of the plant with all the others, through the connection manifolds and the pouring flow selection valves, (FIG. 5,6—no from 7.1.1 to 7.1.4), and with the drain valves that prevent the re-mixing of the waters of different level of pureness (FIG. 5,6—no from 7.4.2 to 7.4.4). The number of pouring manifold corresponds to the number of pouring foreseen in the washing cycle, three in the present case (FIG. 5,6). Practically, each level of water purity correspond to a specific pouring manifold. The water recycling manifold (FIG. 5,6—no 6) connects the manifold (FIG. 5.6—no from 7.3.2) to the pump and from this with the soaking tank which collectively the water contained which is anyway less clean of the all plant. To the supply of clean water and to the product water transfer is dedicated an appropriate manifold (FIG. 5,6—no from 7.3.1). The addressed overflow selection valve have, has above said, the function to link every MWU with all the others that constitute the plant and with external utilities. The liquid overflow from one MWU to the other implies the opening of 2 valves, one for each unloading manifold (FIG. 5,6—no from 7.1.1 to 7.1.4) linking each one to a soly MWU which connect to the same linking manifold (for example the valve couple of number 7.2.1.1 and 7.2.1.3 link the MWU's no 1 and no 3 through the manifold no 7.3.1; the valve couple no 7.2.3.2 and 7.2.3.4 link the MWU's no 2 and no 4 through the manifold no 7.3.3; and so forth). The direction of flow of the liquid is stabilized solely from the difference of absolute pressure present in the MWU in a specific moment. The creation of a determined level of vacuum in the MWU, with the opening of the dedicate empty valve, for example the one relative to 1st MWU (FIG. 5.6—no 5.3.1), implies the aspiration of liquid through its primary low unloading manifold (FIG. 5,6—no da 7.1.1) and through the pre-chosen secondary primary linking manifold, from a secondary MWU which has been put into communication with the opening selecting valve.

8 Clean water and/or treatment fluid supply section (FIG. 6—No 8): it has the function to supply the plant with clean water, purified recycled water and/or other treatment solutions (chilled water, preservative solutions, etc.).

8.1 Network manifold (FIG. 6—no 8.1); it supplies the circuit during the initial operation of refilling before starting the process cycle and to restore the minimum level to supply the actual consumptions.

8.2 Network manifold interception valve (FIG. 6—no 8.2): it has the function of intercepting the network water and the function of stopping every flow of water towards the same network.

8.3 MWU supply manifold (FIG. 6—no 8.3): connects all the MWU of the plant with the network and/or with the process water depuration and recycle system.

8.4 MWU selection valve (FIG. 6—no from 8.4.1 a 8.4.4): has the function of connecting each MWU with the supply manifold; every MWU has a dedicated supply valve.

9 Process water recovery and recycling section (FIG. 6—No 9): it recycles the process water to drastically reduce consumption until 80/90%. This section can consists of a depuration and ultra-filtration system as well as of a thermal and chemical treatment system of the recycled water; anyway, this is an auxiliary part of the system that is not indispensable to the functioning of the equipment and it is not subject to the patent application. It has been briefly described for convenience and to give an idea of the potentiality of the system. We stipulate that the process of water treatment can also be carried out with traditional plants which, however, have such a high water consumption, that require the construction of much powerful and expensive water treatment units.

9.1 Resumption manifold (FIG. 6—no 9.1): it connects the overflow pipe of the soaking tank (FIG. 5,6—no from 1.6) with the treatment sections.

9.2 recycling water pump (FIG. 6—no 9.2.): it supplies the treatment section balancing the water flow based on the waste water discharged.

9.3 MWU water treatment station (FIG. 6—no 9.3): this must be set up and dimensioned in relation to precise operative objectives; it can consist of a micro or ultrafiltration plant, or a thermal treatment or chemical treatment. This section is not included in the present patent request.

9.4 recycled water manifold (FIG. 6—no 9.4): it loads the treated process water in the treatment circuit with priority of use. In the same plant many sections of treatment can exist, each one independent from the other.

10 Remote unloaded worked product transport section (FIG. 6—No 10): in the plants in which the unloading of the product in the remote MWU is foreseen, this section has the function to convey the product at the end of the washing cycle from the MWU in which the washing/treatment cycle has been concluded, (of a conic type, through the appropriate manifold, towards a remote MWU which has an unloading door. During this transport phase the product can be submitted to treatments such as cooling with cold water, conditioning etc.

10.1 Total passage valve (FIG. 6—no 10.1): it has the function of intercepting the transport manifold. It is linked to the base of the cone of the MWU and connects it to the transport manifold.

10.2 Transport manifold (FIG. 6—no 10.2): consists of an air tight tube, which connects to the MWU (FIG. 4—no 3.4) to the remote unloading MWU.

10.3 Remote MWU (FIG. 6—no 10.3): it has the function of grouping the product which comes from the other washing MWU; the only feature that differentiates it from the other washing MWUs is the full-bore unloading door (FIG. 1,2,3—no 3.4). The product accumulates in this MWU before being unloaded. Like any other MWU it is provided with supply valve one, compensation valve, a water recycling valve and a water drain valve. If needed, this MWU can be provided with a spinning basket for centrifugal product drain and with cooled plating for vacuum drying. This also has a full bore unloading door that can vary in form as highlighted in example FIG. 1,2,3—N. 3.4.

10.4 Emptying and recycling pump (FIG. 6—no 10.4): it recycles the water through a dedicate circuit. This circuit is initially filled with water using the vacuum system; after that, the pump is used to convey the product from the washing MWU to the remote MWU. Upon conclusion of the transfer of the product the same pump takes on the function of emptying the water which is deviated through a dedicated valve in the appropriate storage tank.

10.5 Solution recovery and recycling section (FIG. 6—no 10.5): it has the function to link the washing MWU (FIG. 5,6—no from 3.1 a 3.4) with the remote unloaded MWU (FIG. 5,6—no 10.3) and, through the appropriate intersection valve, to allow the recovery of the water in the appropriate storage tank (FIG. 6—no 10.6).

Functioning of the Processing Equipment

It is probably necessary to reassert, for greater clarification, that the washing process with respect to the present patent request, is founded on the MWU that preside over the principal phases of the washing process and constitute therefore the central apparatus, the most important of the whole plant. It is the MWU in fact that determines the real advantage of this process and of this system with respect to other traditional plants. In fact, the modular washing unit:

consent a drastic reduction in water use permitting an elevated concentration of product per unit of volume.

consent an the flow water in counter current with the product: cleaner water is always in contact with cleaner product.

consent the loading of the product in water suspension with the sole application of the relative vacuum between MWUs, without the inter-positioning of any other mechanical obstacle in the manifold consent multiple chemical and physical treatment of the product with possible recovery and recycling of all solutions used, such as chemical treatment solution, chilled water, isotonic solution, and the vacuum drying.

consent notable energy saving limiting the necessity of water cooling at the single final phase of treatment, without the necessity to of air conditioning in the working environment consent the isolation of the product with respect to the working environment eliminating the pollution deriving from external agents consent the execution of a fully automatic clean in place procedure in a confined environment, making it safer for workers and more effective.

consent furthermore the use of other physical or chemical agent in a confined environment for the biological sanitation of the final product.

All the other section of the plant are functional to the washing MWU and depend on the sequence of their working cycle. The different phases of the washing cycle of the different MWU which make up the plant, come one after the other in such a way to determine a given continued liquid flow of product in exit. The end of a phase in one MWU determines the start of the successive MWU and so forth in such a way to generate a sequential and continued process. The bigger the number of the MWU the bigger the level of continuity and functioning of the plant.

For reasons of clarification in the description of the functioning of the plant and of the process we refer to a principle design described in FIG. 6 and to the typology of the MWU as designed in FIGS. 3 and 4.

The same product, as it is, in a working area, taken care and manually checked and eventually cut, is put in the hopper (FIG. 5,6—no 1.1) of the soaking tank (FIG. 5,6—no 1.1) in which it is cleaned from the heaviest dirt helped in this by the turbulence generated by the floatation of the air in the water pushed and continually submerged by the water current generated by the recycling pump, the product is then put slowly and continuously towards the conveyor hopper (FIG. 5,6—no 1.2) situated close to the side of the tank opposite that of the loading hopper (FIG. 5,6—no 1.1). For reason of clarification in the process we refer to what happens in a single MWU, the first (FIG. 6—no 3.1); obviously the working cycle as described repeats itself in all the other MWUs. Due to the effect of depression rhythmically created inside one of the MWU that the plant is composed by, with the opening of the supply valve (FIG. 6—no 2.3.1) and that of the vacuum (FIG. 6—No 4.3.1), the product, mixed in water, is sucked, towards the pouring manifold (FIG. 6—no 2.2), inside the MWU. The lowering of the water level near the product suction point (FIG. 5,6—no 1.2) in the soaking tank, make more water/product mix flow to the suction point (FIG. 5,6—no 2.2). This primes, therefore, the product transfer process towards the first MWU (FIG. 6—no 3.1). When the MWU is full of product-water mix the vacuum valve closes (FIG. 6—no 4.3.1), while the unloading valve opens at the same time (FIG. 6—no 7.2.1.2) and the recycling pump turns on (FIG. 6—no 6.2). The basket (FIG. 6—no 3.1.2) contained in the MWU separates the product from the water. The drained water from the first MWU (FIG. 5,6—no 3.1) is recycled by the pump to the soaking tank creating a closed circuit that draws more product/water mix through the loading manifold to the MWU (FIG. 6—no 2.2). A stacking of product in watery suspension in the MWU basket is then achieved (FIG. 6—no 3.1.2). When the density (quantity) of the product in the basket reaches a certain level, determined by weighting the quantity of product loaded in the soaking basket or based on the duration of the phase, the loading valve closes (FIG. 6—no 2.3.1) and then the compensating valve opens (FIG. 6—No 5.2.1), which restores the atmospheric pressure inside the MWU allowing the regular water flow drain obtained by the recycling pump (FIG. 5,6—no 6.2) until the complete emptying.

The installation in the MWU of a rotating basket, rather then a static one, with the possibility of effecting product spinning, would allow a faster and a more accurate unloading of dirty water, in all the unloading phases, increasing the washing efficiency. The application of spinning baskets must be carefully evaluated since it implies greater costs and investments and the same results can be reached with plants equipped with a greater number of MWU, which allow, with equal production, a greater number of rinses. The adoption of this solution thus depend on a cost analysis relative to each single plant. It must be considered also the possibility that the product is loaded in the MWU using traditional systems (conveyor belts) instead of water, through appropriate hoppers with the help of hydraulic flows used in different ways (Venturi effect).

The product kept in the basket (FIG. 6—no 3.1.2) is at this point ready for washing, which consists in a series of rinses with filling and successive emptying of the MWU (FIG. 6—no 3.1), with water coming from different sources and of different level of cleanliness. The first washing cycle starts with the filling of the first MWU (FIG. 6—no 3.1), just stacked by the product, with water coming from (drained) the second MWU (FIG. 6—no 3.2), installed in parallel in the same plant, with water relatively cleaner with respect to that previously unloaded (the water contained in the soaking tank), on the last passage before being unloaded in the soaking tank. The water pouring off is carried out opening the vacuum valve (FIG. 6—no 4.3.1) of the first MWU (FIG. 6—no 3.1), the compensation valve of the second MWU (FIG. 6—no 3.2) and the pouring flow selection valves (FIG. 6—no 7.2.3.1 and 7.2.3.2, relative to MWU 3.1 and 3.2) through the pouring manifold. When the water transfer has been concluded the next emptying of the first MWU (FIG. 6—no 3.1) happens, conveying the water towards the soaking tank (FIG. 6—no 1); to do this, the vacuum valve is closed unloading valve then closes (FIG. 6—no 4.3.1) and the pouring flow selection valves (FIG. 6—no 7.2.3.1 and 7.2.3.2), the unloading valve (FIG. 6—no 7.2.2.1) and the pressure compensation valve (FIG. 6—no 5.2.1) open and the water is drained by the recycling pump (FIG. 6—no 6.2) and is directed towards the soaking tank (FIG. 6—no 1). Upon complete emptying of the first MWU (FIG. 6—no 3.1), the unloading valve (FIG. 6—no 7.2.2.1) and the compensation valve (FIG. 6—no 5.2.1) close, and the second wash cycle starts, with the filling of first MWU with pouring water coming from the third MWU (FIG. 6—no 3.3), opening again the vacuum valve (FIG. 6—no 4.3.1) and also opening the pouring flow selection valves (FIG. 6—no 7.2.4.1 e 7.2.4.3), that connect the first and the third MWU, through the pouring manifold (FIG. 6—no 7.3.4), which is always used for the second rinse water. The lower absolute pressure generated in the first MWU (FIG. 5,6—no 3.3) of destination allows the passage of water from one to the other. Once the filling is complete, the water is drained again from the MWU, closing the vacuum valve (FIG. 6—no 4.3.1) and the pouring flow selection valves (FIG. 6—no 7.2.4.1 and 7.2.4.3), and opening the compensation valve (FIG. 6—No 5.2.1); this time, however, the discharge water is conveyed toward the fourth MWU (FIG. 6—no 3.4) opening the pouring flow selection valves which connect the same first MWU trough the pouring manifold (FIG. 6—no 5.2.1) to the forth MWU to which the unloaded water is directed. The depression created in the forth MWU (FIG. 6—no 3.4) determines the emptying of the water in the first MWU (FIG. 6—no 3.1). On complete emptying of the first MWU the pouring flow selection valves (FIG. 6—no 7.2.3.1 and 7.2.3.4) and the compensation valves (FIG. 6—no 5.2.1) close and the third washing cycle starts with the re-opening of the vacuum valve (FIG. 5,6—no 4.3.1) together with the pouring flow selection valves (FIG. 6—no 7.2.5.1 and 7.2.5.4) which connect the first MWU (FIG. 5,6—no 3.1) with the third MWU (FIG. 5,6—no 3.3) through the water pouring manifold (FIG. 6—no 7.3.5). The difference in relative pressure in the MWU, provokes the passage of water from one to another. At complete filling of the third MWU, the vacuum valve (FIG. 6—No 5.3.1) and the pouring flow selection valves (FIG. 5,6—no 7.2.5.1 e 7.2.5.4) close, the compensation valve (FIG. 6—no 5.2.1) and the pouring flow selection valves (FIG. 6—no 7.2.4.1 e 7.2.4.3) which link the 1° MWU (FIG. 6—no 3.1) to the 3° (FIG. 6—no 3.3) towards which the vacuum created with the opening of the relative valve draws the water. On complete emptying the pouring flow selection valves close (FIG. 6—no 7.2.4.1 e 7.2.4.3) and so does the compensation valve (FIG. 6—no 5.2.1), and the fourth and final washing cycle begins, which is made with pure water. The vacuum valve (FIG. 6—no 4.3.1) and the supply selection valve (FIG. 6—No 8.4.1) open, to connect the first MWU, through the appropriate manifold (FIG. 6—no 8.3), to the hydraulic network or recycled purified water tank. On complete loading the supply valve closes (FIG. 6—no 8.4.1) and so does the vacuum valve (FIG. 6—no 4.3.1) and the compensation valve opens (FIG. 6—no 5.2.1). The pouring flow selection valves (FIG. 6—no 7.2.5.1 e 7.2.5.2) and the vacuum valve (FIG. 6—no 4.3.2) in the 2° MWU (FIG. 6—no 3.2) open, which determines the emptying of the 1° MWU (FIG. 6—no 3.1). When needed, the washing cycle with pure water can be repeated. The emptying of water on the fourth wash cycle, which could be repeated if necessary, determines the consensus for the execution of other phases of the process, for example, chemical treatment, drying, cooling or other, or determine the transfer of the product, in the case that the plant is configured as in FIG. 6, in the remote MWU (FIG. 6—no 10.3). The transfer of the product to the remote MWU (FIG. 6—no 10.3) happens on the opening of the vacuum valve in the remote MWU (FIG. 6—no 10.6), with the opening of the clean water supply valve (FIG. 6 no 8.4.1) and of the pouring flow selection valves (FIG. 6—no 7.2.1.1). When the pouring manifold is full of clean water, that can be chilled if necessary, the vacuum valve close (FIG. 6—no 10.6), the recycling valve in the soaking tank closes (FIG. 6—n1.4), the water recycle valve opens (FIG. 6—no 6.3) and the transfer pump starts (FIG. 6—10.4) allowing the transfer of the product from the first MWU (FIG. 6—no 3.1) to the remote one (FIG. 6—no 10.3). On the conclusion of the transfer of the product, the compensation valve of the remote MWU opens (FIG. 6—no 10.7), the pouring flow selection valves close (FIG. 6—no 7.2.1.1), the valve of the accumulation tank opens (FIG. 6—no 10.7) and the emptying of the entire product transfer circuit begins, storing the water in the tank (FIG. 6—no 10). On the complete emptying the door of the remote MWU opens (FIG. 6—no 3.1.4 and FIG. 3—no 3.1.4) and the product is unloaded.

The original position of the valve of the remote MWU is restored (FIG. 6—no 10.3), ready for another unloading transfer cycle.

The cycle described above happens in an ordered sequence in each MWU and in the plant produces the unloading of the washed product with constant frequency: as the duration of the phases of washing remain the same, the greater the number of MWU in the plant and the greater the frequency of unloading of the product and the greater the production results. Obviously the correspondence of the number of MWU with a number of determined rinses determines a greater regularity in unloading. The sequence of function in the whole plant is PLC controlled. On its configuration the plant is thus extremely flexible and within limits can be adapted to different working conditions and different products, by varying the software configuration. Configuration of the plant and the conception of the equipment allow cyclic working operation and disinfection in a completely automated way. The above said working operations and disinfections (CIP) are carried out as a normal vacuum wash with recovery and recycling of cleaning and disinfecting solutions.

BRIEF DESCRIPTION OF DRAWINGS

FIG. 1 shows the section of a MWU (Modular Washing Unit) which has an inferior lever door which can be pivoted, in the closed position; this configuration, especially the unloading door typology (no 3.1.4), is adapt to the unloading of products that don't slide easily. This is also suitable to carrying out remote unloading MWU functions.

FIG. 2 shows the perspective of the same MWU shown in FIG. 1 with inferior door in open position.

FIG. 3 shows a section of a different type of MWU which has an lower conical door which slides vertically, which is adapt for sliding products. This is adapt to function as remote MWU.

FIG. 4 shows a section of a MWU with an inferior conveying cone, leaning towards the manifold, that is pre-disposed for the transfer of the product in watery suspension to another remote MWU of the type shown in FIGS. 1/2 and 3.

BEST MODE FOR CARRYING OUT THE INVENTION

Figure 5:
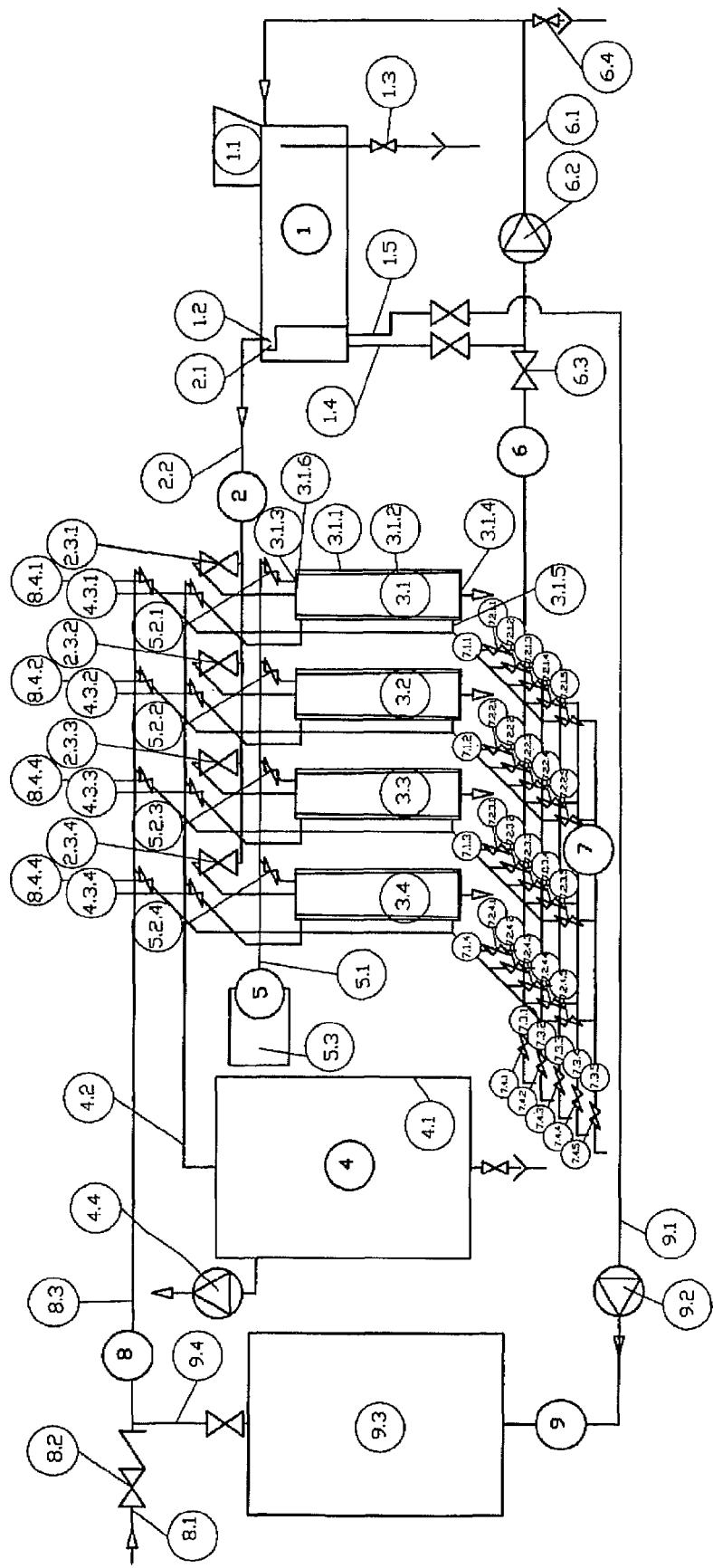
FIG. 5 shows a possible principle design of plant with 4 MWU with direct product discharge doors.
Figure 6:
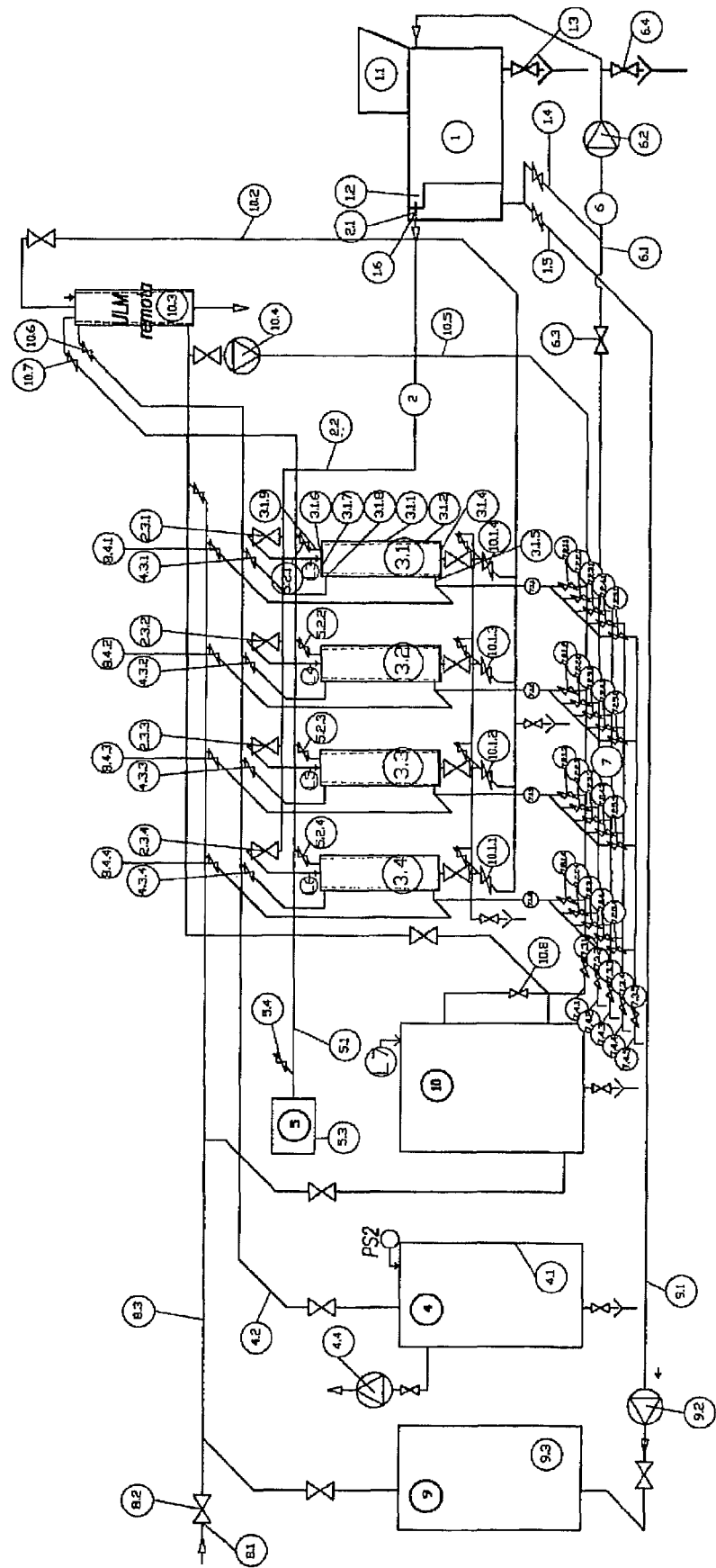
FIG. 6 shows a possible principle design of plant with 4 MWU with conveying inferior cones (FIG. 4—3.1.7) suitable to transfer the product to a remote MWU provided with unloading door (FIG. 3—no 3.1.4).

The MWU washing technology is extremely versatile being able to reply to various demands as reported in the designs in FIGS. 5 and 6.

In particular, the configuration designed in FIG. 6, satisfies the widest range of demand conserving and maximising the advantages that this technology offers with respect to the available technology in use today. The constructive issues listed below refer to a plant configured similar to the one in FIG. 6.

From a constructive point of view the central unit of a washing plant or treatment plant based on MWU technology of which the present pattern request refers is composed of a few modular elements:

Loading unit (Loading and soaking section)
Modular washing unit with conveying cones (FIG. 4)
Modular washing unit with unloading door (FIG. 3)
pouring manifold (described in no 3.5)
Product supply manifold (described in no 2)
Vacuum manifold (described in no 4.2)
Compensation manifold (described in no 5.2)
Product transfer and unloading manifold (described in no 10)
Unloading flow manifold (described in no 6)
Unloading manifold (described in no 7)

The elements mentioned above remain the same regardless the dimensions and the working capacity of each unit in the plant; only the dimension of the supporting frame varies and the pouring manifold size. Except for the full-bore valves which intercept the supply manifold (FIG. 6—no 2.3) and product unloading manifold (FIG. 6—no 10.3), which require a passage of large dimensions (indicatively 4" total passage), all the other valves, all of the same type, have only 2 dimensions: vacuum and compensation valves have about 1" size, all the others about 2" size The auxiliary section that generate vacuum and treat and recycle water, represent external mono-stack units which are independent from the central unit to which is connected by appropriate manifolds. The central unit is very compact and of contained dimensions, sensibly smaller than that of actual working lines. The auxiliary section mentioned above can be connected in remote positions with respect to the central unit and the entire plant therefore results to be very flexible and adaptable to the most varied forms and dimensions of the premises in which it must be installed.

If the remote MWU, where the treated product is sent for a unloading, is provided with a spinning basket, it can be installed inside close conditioning and weighing boxes where it is possible to control the working environment atmosphere. This technology doesn't foresee the use of open conveyor belts which are difficult to clean and maintain.

Also from a construction point of view the MWU technology presents advantages with respect to the present technology in use, in fact:

The entire system, of any dimension, is built with a small number of modular pieces;
Mechanically the machine presents few pieces subjected to wear (valve's seal) and all of the same kind, reducing the number and the cost of the spare parts;
The system is suitable to operate in many different ways without mechanical modification, just modifying the software to the new requirements, which can be done also by remoter supervision,
It is suitable for further process developments with the addition of new and exclusive external auxiliary section, with minimum mechanical implication;
Industrial costs of constructions are quite low and competitive with respect to traditional plants while guaranteeing technological advantages.

INDUSTRIAL APPLICABILITY

The equipment and process described herewith finds application in the construction of new plants and in the substitution of existing plants where a reduction of the water consumption is required and consequently the reduction in polluting industrial flows is indispensable. In particular it is a useful application in washing plants for the production of fresh fruits and vegetables ready for use. The consumption of packed mixed vegetables as well as of cut fruit is expanding in Europe and in America. Traditional plants of the sector determine a strong negative environment impact both in terms of water and energy consumption and also in terms of polluting flows. Furthermore their management conveys a massive use of chemical product and disinfectants that are problematic for health and are used more and more. The industrial applicability of this plant and of the described procedure appears evident both for the substitution of existing plants and for the realisation of new ones also considering the general regulatory trend that focuses more and more on energy saving. This technology adequately dimensioned can also be applied in big agriculture industries.

The invention claimed is:
1. An apparatus for washing and treating vegetables and fruits in general, said apparatus comprising modular washing units (MWU);
where each MWU including a water tight outer casing, connected to a superior closing head and inferior closing door; the outer casing including an outer shell that is suitable to withstand both positive and negative pressure;

wherein a basket is positioned inside the water tight outer casing, wherein the basket has a shape that is the same as a shape of the outer shell and the basket is coaxial with the outer shell, yet is slightly smaller in size to form a liquid flow chamber;

wherein the internal basket is open on both extremities and provided with wall holes or openings to withhold product to be washed in combination with the inferior closing door while allowing flow of washing liquid;

wherein the superior closing head of the MWU is provided with a connection to a feed manifold, equipped with a suitable valve; wherein the product to be processed, which is initially stored in liquid suspension in a suitable feeding hopper, is capable of being drawn by vacuum through said valve into the basket of the MWU;

wherein the vacuum is provided by a vacuum system that is provided via a connection with the superior closing head, wherein the superior closing head is equipped with a superior closing head valve separated from the basket by a filter screen that prevents processed product from being drawn by the vacuum;

wherein an outlet is provided on the lower edge of the external shell of the water tight casing such that washing liquid is permitted to be discharged at completion of a washing process through the outlet, while the processed product is held inside the basket;

wherein the discharged liquid is flowable to different destinations, based upon a particular process phase:

in one process phase, the discharged liquid is positioned to be pumped to the feeding hopper by the re-circulation pump to increase the quantity of product loaded in the MWU to optimize the water/product ratio;

in another process phase, the discharged liquid is positioned to be drawn by vacuum to another MWU, according to a predetermined washing sequence to optimize water use in the washing process; in a further process phase, the discharged liquid is positioned to be also pumped to a storage tank for re-use;

wherein the inferior closing door of the MWU features a different design according to the product discharge system in use;

wherein the product can be discharged dry from each MWU, in which case the inferior closing door consists of a conical full bore door; said door being connected to a opening system including a sliding bar coaxial with the internal basket, moved by an hydraulic or pneumatic piston; such that when the door is closed the door adheres hermetically to the outer casing, when the door is open the door forms a discharge opening as wide as the internal basket to allow the product to fall by gravity from the basket;

wherein the processed product is transportable to a remote MWU for further treatment, and wherein the inferior closing includes a cone shaped body provided with a suitable discharge valve, connected to a product transport manifold, through which the processed product is transportable in liquid suspension by at least one of the vacuum system and the re-circulation pump to a remote MWU for a final discharge.

2. An apparatus, according to claim 1, wherein each pump used for product transport is dedicated to a determined level of pollution of transported water.

3. An apparatus according to claim 1, wherein the outer casing of the MWU is further provided with an external shell for circulation of cooling solution.

4. An apparatus, according to claim 1, wherein the basket of each MWU is operated by electric, pneumatic or hydraulic motors, to allow centrifugal separation of washing liquid at each discharge cycle.

5. A method for the washing and treatment of fruits and vegetables using the apparatus as claimed in claim 1, in which a sequence of the washing cycle is carried out using the steps of:

(a) soaking the product stored in the feeding hopper to allow separation of heavier dirt fraction;

(b) loading processed product in the basket of the Modular Washing Unit; wherein the process starts by creating vacuum inside the MWU to draw water and product from the feeding hopped into the basket of the MWU; and wherein when the MWU is filled with water, additional product is drawn using a re-circulation pump until a predetermined load is achieved;

(c) cyclically filling and discharging the MWU with progressively cleaner water, and subsequently with pure water at the end of the process;

(d) immersing the product in anti-oxidizing and anti-bacterial solutions inside the MWU;

(e) cooling, dripping and drying the product contained in a confined environment of the MWU, using a method of that involves any of washing the product with chilled water, and vacuum drying the product, centrifugation of the product;

(f) providing a transport liquid to the MWU and transporting the product in transport liquid suspension to a remote MWU for final product discharge; and (g) discharging the processed product from the remote MWU at a cycle end.

6. A method according to claim 5, wherein the product in the internal basket of the MWU, was previously filled with water using vacuum, employs a re-circulation pump that generates a negative pressure inside the MWU, which is positioned to draw product in liquid suspension from the feeding hopper, and wherein the product that loaded in the MWU is withheld in the basket, while the liquid is drained through the filter screen of the basket and pumped back to the feeding hopper and re-cycled until a desired quantity of the product is loaded in the MWU.

7. A method according to claim 5, wherein the steps of loading and transporting the processed product in liquid suspension involve applying vacuum in a destination MWU; wherein the vacuum is achieved by one of a dedicated vacuum pump and/or by drawing the liquid contained in the destination MWU using the re-circulation pump; such that the product is transported in liquid suspension without contact with mechanical parts, preserving its physical integrity.

8. A method, according to claim 5, wherein the steps of loading the processed product involves use of Venturi effect combined with the vacuum generated by the re-circulation pump, to draw the processed product in liquid suspension from the feeding hopper and to load and stack it into the basket of the MWU.

9. A method, according to claim 5, wherein the steps occur inside the confined environment of the MWU, and wherein said method further includes the steps of at least one of irradiating the product, chemically treating the product, thermally treating the product, centrifugally drying the product, vacuum cooling the product and vacuum drying the product, without moving the product.

10. A method, according to claim 5, wherein flow of water from a MWU to another MWU is made through different connection manifolds, each one of which is dedicated to a determined level of pollution of transported water, to prevent water mixing and cross contamination.

* * * * *

UNITED STATES PATENT AND TRADEMARK OFFICE
CERTIFICATE OF CORRECTION

| | | |
|---|---|---|
| PATENT NO. | : 8,828,146 B2 | Page 1 of 1 |
| APPLICATION NO. | : 12/876540 | |
| DATED | : September 9, 2014 | |
| INVENTOR(S) | : Italo Boschetti | |

It is certified that error appears in the above-identified patent and that said Letters Patent is hereby corrected as shown below:

On the Title page, please add:

Item "(30) Foreign Application Priority Data
    Mar. 6, 2008 (IT) TV2008A000038"

Signed and Sealed this

Second Day of December, 2014

Michelle K. Lee
*Deputy Director of the United States Patent and Trademark Office*